US012592180B2

(12) United States Patent
Kim et al.

(10) Patent No.: US 12,592,180 B2
(45) Date of Patent: Mar. 31, 2026

(54) DISPLAY DEVICE

(71) Applicant: Samsung Display Co., LTD., Yongin-si (KR)

(72) Inventors: Heendol Kim, Yongin-si (KR); Yong-Bum Kim, Yongin-si (KR); Byungkil Jeon, Yongin-si (KR); Joonho Hyun, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/588,799

(22) Filed: Feb. 27, 2024

(65) Prior Publication Data

US 2024/0420622 A1 Dec. 19, 2024

(30) Foreign Application Priority Data

Jun. 13, 2023 (KR) ........................ 10-2023-0075555

(51) Int. Cl.
*G09G 3/32* (2016.01)

(52) U.S. Cl.
CPC ....... *G09G 3/32* (2013.01); *G09G 2310/0275* (2013.01); *G09G 2310/08* (2013.01); *G09G 2330/021* (2013.01)

(58) Field of Classification Search
CPC ............. G09G 3/32; G09G 2310/0275; G09G 2310/08; G09G 2330/021; G09G 3/20; G09G 2340/0435
See application file for complete search history.

(56) References Cited

U.S. PATENT DOCUMENTS

| | | | | |
|---|---|---|---|---|
| 8,125,424 B2 | 2/2012 | Hong et al. | | |
| 10,909,909 B2 | 2/2021 | Lee et al. | | |
| 2012/0169698 A1* | 7/2012 | Park | G09G 3/20 | 345/211 |
| 2019/0180695 A1* | 6/2019 | Ha | G09G 3/2051 | |
| 2020/0005723 A1* | 1/2020 | Kim | G09G 3/3696 | |
| 2020/0168159 A1* | 5/2020 | Kim | G09G 3/3266 | |
| 2023/0117873 A1* | 4/2023 | Kim | G09G 3/3233 | 345/55 |
| 2023/0178003 A1* | 6/2023 | Kim | G09G 3/32 | |

FOREIGN PATENT DOCUMENTS

| | | |
|---|---|---|
| KR | 100670046 B1 | 1/2007 |
| KR | 101362155 B1 | 2/2014 |
| KR | 1020200072228 A | 6/2020 |

* cited by examiner

*Primary Examiner* — Patrick N Edouard
*Assistant Examiner* — Joseph P Fox
(74) *Attorney, Agent, or Firm* — CANTOR COLBURN LLP

(57) ABSTRACT

A display device includes a driving controller which receives an image signal and a signal including a command for entering a low power mode, or a command for terminating the low power mode, and generates or receives a first synchronization signal and a second synchronization signal, a panel driver which operates in response to a control signal provided from the driving controller, and a display panel which is controlled by the panel driver. The panel driver includes a data driving circuit which provides a data signal to the display panel in synchronization with the first synchronization signal, and the driving controller changes the control signal by counting a clock of the second synchronization signal, when receiving the command for entering the low power mode or the command for terminating the low power mode.

19 Claims, 10 Drawing Sheets

DISPLAY DEVICE

This application claims priority to Korean Patent Application No. 10-2023-0075555, filed on Jun. 13, 2023, and all the benefits accruing therefrom under 35 U.S.C. § 119, the content of which in it entirety is herein incorporated by reference.

BACKGROUND

1. Field

Embodiments of the disclosure described herein relate to a display device with reduced power consumption and improved performance.

2. Description of the Related Art

An emissive display device of display typically devices displays an image by using a light emitting diode that emits a light, as electrons and holes are recommended with each other. The emissive display device may have a rapid response speed and be driven with lower power consumption. The emissive display device may include pixels connected to data lines and scan lines. Each pixel typically includes a light emitting diode and a circuit to control a quantity of current flowing through the light emitting diode. The pixel circuit controls the quantity of current flowing from a node, to which a first driving voltage is provided, to a node, to which a second driving voltage is provided, through the light emitting diode to correspond to a data signal. In this case, light having a specific brightness is generated to correspond to the quantity of current flowing through the light emitting diode.

SUMMARY

Embodiments of the disclosure relates to a display device with reduced power consumption and improved performance.

According to an embodiment, a display device includes a driving controller which receives an image signal and a signal including a command for entering a low power mode, or a command for terminating the low power mode, and generates or receives a first synchronization signal and a second synchronization signal, a panel driver which operates in response to a control signal provided from the driving controller, and a display panel which is controlled by the panel driver, where the display panel selectively operates in a first mode for operating at a specific driving frequency or a second mode for operating at a variable driving frequency. In such an embodiment, the panel driver includes a data driving circuit which provides a data signal to the display panel in synchronization with the first synchronization signal, and the driving controller changes the control signal by counting a clock of the second synchronization signal, when receiving the command for entering the low power mode or the command for terminating the low power mode.

In an embodiment, a frequency of the first synchronization signal may be varied to correspond to a driving frequency of the display panel.

In an embodiment, a maximum frequency of the first synchronization signal, which corresponds to a maximum frequency of the variable driving frequency, may be equal to or less than a frequency of the second synchronization signal.

In an embodiment, the second synchronization signal may be different from the first synchronization signal.

In an embodiment, the driving controller may generate the second synchronization signal to have a frequency obtained by multiplying a frequency of the first synchronization signal by a number of cycles included in one frame corresponding to the frequency of the first synchronization signal.

In an embodiment, the second synchronization signal and the first synchronization signal may be defined by a same signal.

In an embodiment, the driving controller may change a count reference value serving as a reference for changing a state of the control signal.

In an embodiment, the driving controller may designate, as a first count reference value, a count reference value at a maximum frequency of the first synchronization signal corresponding to a maximum frequency of the variable driving frequency, and the driving controller may generate a second count reference value, which is less than the first count reference value, based on an operating frequency of the first synchronization signal corresponding to the variable driving frequency, when receiving the command for entering the low power mode or the command for terminating the low power mode.

In an embodiment, the second count reference value may be obtained based on a value obtained by multiplying a value, which is obtained by dividing the operating frequency by the maximum frequency of the first synchronization signal, by the first count reference value.

In an embodiment, the driving controller may generate the second synchronization signal by changing an operating frequency of the first synchronization signal corresponding to the variable driving frequency, when receiving the command for entering the low power mode or the command for terminating the low power mode.

In an embodiment, the driving controller may generate the second synchronization signal by changing the operating frequency of the first synchronization signal to a maximum frequency, when the operating frequency of the first synchronization signal is lower than the maximum frequency of the first synchronization signal corresponding to a maximum frequency of the variable driving frequency.

In an embodiment, the driving controller may change the control signal from a first state to a second state different from the first state by counting a clock of the second synchronization signal, when receiving the command for entering the low power mode.

In an embodiment, The driving controller may change the control signal from the second state to the first state by counting the clock of the second synchronization signal, when receiving the command for terminating the low power mode.

According to an embodiment, a display device may include a driving controller which receives an image signal, and a signal including a command for entering a low power mode, or a command for terminating the low power mode, and generates a synchronization signal, a panel driver which operates in response to a control signal provided from the driving controller, and a display panel which is controlled by the panel driver. In such an embodiment, the driving controller generates a count value by counting a clock of the synchronization signal, when receiving the command for entering or terminating the low power mode, and change the control signal from a first state to a second state different from the first state, when the count value is equal to or greater than a count reference value. In such an embodiment, at least one selected from a frequency of the synchronization signal and the count reference value is constant.

In an embodiment, the panel driver may include a data driving circuit which provides a data signal to the display panel in synchronization with the synchronization signal, and the display panel may selectively operate in a first mode for operating a specific driving frequency or a second mode for operating at a variable driving frequency.

In an embodiment, the driving controller may designate, as a first count reference value, a count reference value at a maximum frequency of the synchronization signal corresponding to a maximum frequency of the variable driving frequency, and the driving controller may generate a second count reference value, which is less than the first count reference value, based on an operating frequency of the synchronization signal corresponding to the variable driving frequency, when receiving the command for entering the low power mode or the command for terminating the low power mode.

In an embodiment, the driving controller may change an operating frequency of the synchronization signal to a maximum frequency of the variable driving frequency, when the operating frequency of the synchronization signal corresponding to the variable driving frequency is lower than a maximum frequency of the synchronization signal corresponding to the maximum frequency of the variable driving frequency, and when receiving the command for entering the low power mode or the command for terminating the low power mode.

In an embodiment, the panel driver may include a data driving circuit which provides a data signal to the display panel in synchronization with a vertical synchronization signal, the display panel may selectively operate in a first mode for operating a specific driving frequency or a second mode for operating at a variable driving frequency, and a maximum frequency of the vertical synchronization signal, which corresponds to a maximum frequency of the variable driving frequency, may be equal to or less than a frequency of the synchronization signal.

According to an embodiment, a display device may include a driving controller which receives an image signal, and a signal including a command for entering a low power mode, or a command for terminating the low power mode, and generates a synchronization signal, a panel driver which operates in response to a control signal provided from the driving controller, and a display panel which is controlled by the panel driver, where the display panel selectively operates in a first mode for operating at a specific driving frequency or a second mode for operating at a variable driving frequency. In such an embodiment, the panel driver includes a data driving circuit which provides a data signal to the display panel in synchronization with the synchronization signal, and the driving controller changes the control signal based on the synchronization signal after a specific time period, when receiving the command for entering the low power mode or the command for terminating the low power mode, and a frequency of the synchronization signal is changed from a first frequency to a second frequency which is equal to or greater than the first frequency, when receiving the command for entering the low power mode or the command for terminating the low power mode.

In an embodiment, the driving controller may change the first frequency to a maximum frequency of a variable driving frequency, when the first frequency is lower than a maximum frequency of the synchronization signal corresponding to the maximum frequency of the variable driving frequency.

BRIEF DESCRIPTION OF THE DRAWINGS

The above and other features of embodiments of the disclosure will become apparent by describing in detail embodiments thereof with reference to the accompanying drawings.

DETAILED DESCRIPTION

Figure 1:
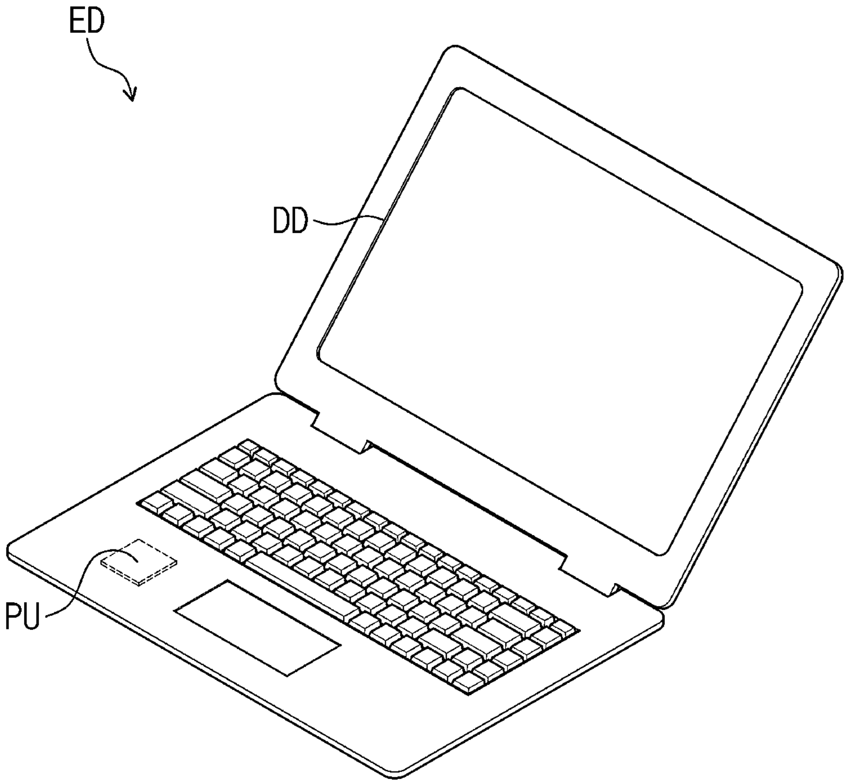
FIG. 1 is a perspective view of an electronic device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numeral will be assigned to the same component. In addition, in drawings, thicknesses, proportions, and dimensions of components may be exaggerated to describe the technical features effectively.

Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component.

In addition, the terms "under", "at a lower portion", "above", "an upper portion" are used to describe the relationship between components illustrated in drawings. The terms are relative and are described with reference to a direction indicated in the drawing.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

The terms "part" and "unit" refer to a software component or a hardware component to perform a specific function. The hardware component may include field-programmable gate array (FPGA) or an application-specific integrated circuit (ASIC). Software components may indicate data used by executable codes and/or executable codes in a storage medium which is able to be addressed. Accordingly, software components may be, for example, object-oriented software components, class components, and task components, and may include processes, functions, properties, procedures, subroutines, program code segments, driver data, firmware, micro codes, circuits, data, database, data structures, tables, arrangements or variables.

Unless otherwise defined, all terms (including technical terms and scientific terms) used in the specification have the same meaning as commonly understood by one skilled in the art to which the disclosure belongs. Such terms as those defined in a generally used dictionary are to be interpreted as having meanings equal to the contextual meanings in the relevant field of art, and are not to be interpreted as having ideal or excessively formal meanings unless clearly defined herein.

Hereinafter, embodiments of the disclosure will be described in detail with reference to accompanying drawings.

FIG. 1 is a perspective view of an electronic device ED according to an embodiment of the disclosure.

Referring to FIG. 1, an embodiment of the electronic device ED may be activated, in response to an electrical signal. For example, the electronic device ED may be a cellular phone, a foldable phone, a laptop computer, a television, a tablet, a vehicle navigation system, a game console, or a wearable device, but the disclosure is not limited thereto. FIG. 1 illustrates an embodiment where the electronic device ED is a laptop computer by way of example.

The electronic device ED may include a display device DD and a processing unit PU.

The display device DD may be a component to actually generate an image. The display device DD may be an emissive-type display device. In an embodiment, for example, the display device DD may be an organic light emitting display device, an inorganic light emitting display device, an organic-inorganic light emitting display device, a quantum dot display device, a micro-light emitting diode (LED) display device, or a nano-LED display device. In addition, according to an embodiment of the disclosure, the display device DD may further include a function of sensing an external input. For example, the display device DD may be configured to sense at least any one of an active input by an input device and a passive input by a touch. The touch may include an input unit, such as the physical body of a user or an input device (e.g., a pen), to provide the change in capacitance.

The processing unit PU may control the operations of a driving controller TC (see FIG. 2) and a panel driver P-DV (see FIG. 2), which are included in the display device DD. According to an embodiment of the disclosure, the processing unit PU may include a graphic controller.

Figure 2:
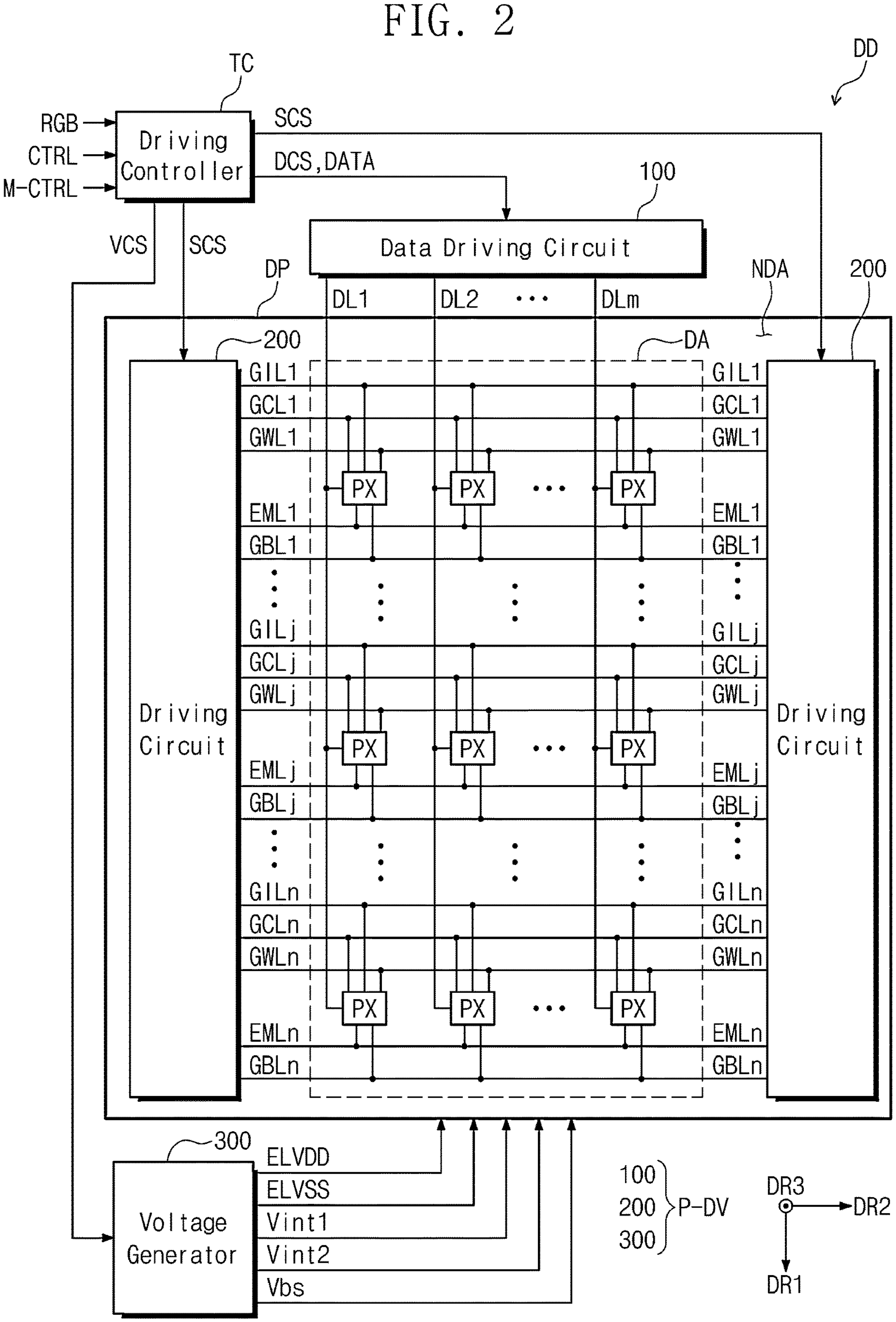
FIG. 2 is a block diagram of a display device according to an embodiment of the disclosure.

FIG. 2 is a block diagram of a display device DD according to an embodiment of the disclosure.

Referring to FIG. 2, an embodiment of the display device DD may include the display panel DP, the driving controller TC, and the panel driver P-DV. According to an embodiment of the disclosure, the panel driver P-DV may include a data driving circuit 100 (or a data driver), driving circuits 200, and a voltage generator 300.

The display panel DP may include a display region DA and a non-display region NDA. The display panel DP may include a plurality of pixels PX disposed in the display region DA. Each of the pixels PX includes a light emitting element and a pixel circuit to control to emit light from the light emitting element. The pixel circuit may include at least one transistor and at least one capacitor.

The display panel DP further includes initialization scan lines GIL1 to GILn, compensation scan lines GCL1 to GCLn, write scan lines GWL1 to GWLn, bias scan lines GBL1 to GBLn, light emitting control lines EML1 to EMLn, and data lines DL1 to DLm. Here, n and m are natural numbers. However, the disclosure is provided only for the illustrative purpose, and the signal lines included in the display panel DP are not limited to the above example.

The driving controller TC receives an image signal RGB, a control signal CTRL, and a mode control signal M-CTRL. The driving controller TC generates an image data signal by converting a data format of the image signal RGB to be matched with the interface specification with the data driving circuit 100. The driving controller TC may output a first control signal SCS, a second control signal DCS, and a third control signal VCS.

The display panel DP may be configured to selectively operate in a first mode for operating at a specific driving frequency (e.g., a specific constant driving frequency of 60 Hz, 120 Hz, or 240 Hz) or a second mode for operating at a variable driving frequency. In an embodiment, for example, the variable driving frequency may be varied in the range of 1 Hz to 240 Hz, but the range of the driving frequency is not limited thereto.

In an embodiment, the image signal RGB may be input at a random cycle in the second mode, for example, a game environment, for operating at the variable driving frequency. In such an embodiment, the driving controller TC may perform a cycle operation to correspond to a random input frequency. In an embodiment, for example, when the input cycle for the image signal RGB is increased, the number of hold cycles included in one frame may be increased. When the input cycle for the image signal RGB is decreased, the number of hold cycles included in one frame may be decreased.

The mode control signal M-CTRL may be a signal provided from the processing unit PU (see FIG. 1). The mode control signal M-CTRL may be a signal including a command for a lower-power operation. In an embodiment, for example, the mode control signal M-CTRL may be a signal including a command for entering a low power mode and a command for terminating the low power mode.

The processing unit PU may output, to the driving controller TC, the mode control signal M-CTRL including the command for entering the lower power mode, when an event for the low power mode occurs. In an embodiment, for example, the event for the low power mode may occur in a situation that a user does not use the electronic device ED (see FIG. 1). When the electronic device ED has no input (e.g., an input through a touch pad, a mouse, a screen touch, or a keyboard) for a preset time, or when the action of the user is not recognized through a camera included in the electronic device ED, the event for the low power mode is determined as occurring.

The driving controller TC may turn off the screen of the display panel DP, in response to (or upon receiving) the mode control signal M-CTRL including the command for entering the low power mode, by controlling the first control signal SCS, the second control signal DCS, and the third control signal VCS provided to the panel driver P-DV. Accordingly, the power consumption of the electronic device ED (see FIG. 1) may be reduced. Even if the screen of the display panel DP is turned off, the driving controller TC may be maintained to be turned on. An operation for turning off the screen of the display panel DP and for maintaining the driving controller TC to be turned on may be referred to as a zero refresh operation.

When an event for terminating the low power mode occurs, the processing unit PU may output, to the driving controller TC, the mode control signal M-CTRL including the command for terminating the low power mode. The driving controller TC may turn on the screen of the display panel DP by controlling the first control signal SCS, the second control signal DCS, and the third control signal VCS provided to the panel driver P-DV.

The operation for entering or terminating the low power mode may occur in the second mode in which the display device DD operates at the variable driving frequency. According to an embodiment of the disclosure, the driving controller TC may consistently maintain the time interval between a time point when the command for entering the lower power mode or the command for terminating the lower power mode is received and the 'on' or 'off' operation of the display panel DP, after receiving the command for entering or terminating the low power mode, and the details thereof will be described below. In other words, when the operation for entering or terminating the low power mode occurs in the second mode for operating at the variable driving frequency, the time difference between a time point when a command for entering or terminating the lower power mode is received and 'on' or 'off' operation of the display panel DP may be removed or reduced. Accordingly, the consistency in operation of the electronic device ED (see FIG. 1) may be improved, such that the product quality is improved.

The data driving circuit 100 receives the data control signal DCS and the image data signal DATA from the driving controller TC. The data driving circuit 100 may convert the image data signal DATA into data signals and outputs the data signals to the data lines DL1 to DLm. The data signals are analog voltages corresponding to grayscale values of the image data signal DATA. The data lines DL1 to DLm may be arranged in a second direction DR2 and each of the data lines DL1 to DLM may extend in a first direction DR1.

The driving circuit 200 may be disposed in the non-display region NDA of the display panel DP, but the disclosure is not limited thereto. in an embodiment, for example, at least a portion of the driving circuit 200 may be disposed in the display region DA. Driving circuits 200 may include transistors formed through a same process as that of the pixel circuit of the pixel PX.

The driving circuit 200 may receive the first control signal SCS and may output a scan signal and a light emitting signal to the initialization scan lines GIL1 to GILn, the compensation scan lines GCL1 to GCLn, the write scan lines GWL1 to GWLn, the bias scan lines GBL1 to GBLn, the first light emitting control lines EML11 to EML1*n*, and the second light emitting control lines EML21 to EML2*n*.

In an embodiment, the driving circuits 200 may be provided in plural, that is, a plurality of driving circuits 200 may be provided. In an embodiment, for example, the plurality of driving circuits 200 may be spaced apart from each other while the display region DA is interposed between the plurality of driving circuits 200. The initialization scan lines GIL1 to GILn, the compensation scan lines GCL1 to GCLn, the write scan lines GWL1 to GWLn, the bias scan lines GBL1 to GBLn, and the light emitting control lines EML1 to EMLn may be electrically connected to the driving circuits 200 to receive signals from the driving circuits 200, respectively.

In such an embodiment, each of the driving circuits 200 may include a scan driving circuit connected to the initialization scan lines GIL1 to GILn, the compensation scan lines GCL1 to GCLn, the write scan lines GWL1 to GWLn, and the bias scan lines GBL1 to GBLn, and a light emitting control driving circuit connected to the light emitting control lines EML1 to EMLn. One initialization scan line GIL1, one compensation scan line GCL1, one write scan line GWL1, one bias scan line EBL1, and one light emitting control line EML1 may receive a same signal from two driving circuits 200. However, this is provided only for the illustrative purpose, and one of two driving circuits 200 illustrated in FIG. 2 may be omitted. Alternatively, a scan driving circuit and a light emitting control driving circuit may be spaced apart from each other while interposing the display region DA between the scan driving circuit and the light emitting control driving circuit.

Each of the initialization scan lines GIL1 to GILn, the compensation scan lines GCL1 to GCLn, the write scan lines GWL1 to GWLn, the bias scan lines EBL1 to EBLn, and light emitting control lines EML1 to EMLn may extend in the second direction DR2 and may be spaced apart from each other in the first direction DR1.

Each of the plurality of pixels PX may be electrically connected to four scan lines, one light emitting control line, and one data line. In an embodiment, for example, as illustrated in FIG. 2, pixels in a first row (i.e., pixel row) may be connected to the scan lines GIL1, GCL1, GWL1, and GBL1 and the light emitting control line EML1. In an embodiment, for example, the pixels in the first row may be connected to the data line DL1. Furthermore, pixels in a j-th row may be connected to the scan lines GILj, GCLj, GWLj, and GBLj and the light emitting control line EMLj.

The voltage generator 300 receives a third control signal VCS and generates voltages used for an operation of the display panel DP. According to an embodiment, the voltage generator 300 may generate a first driving voltage ELVDD, a second driving voltage ELVSS, a first initialization Vint1, a second initialization voltage Vint2, and a bias voltage Vbs.

Figure 3:
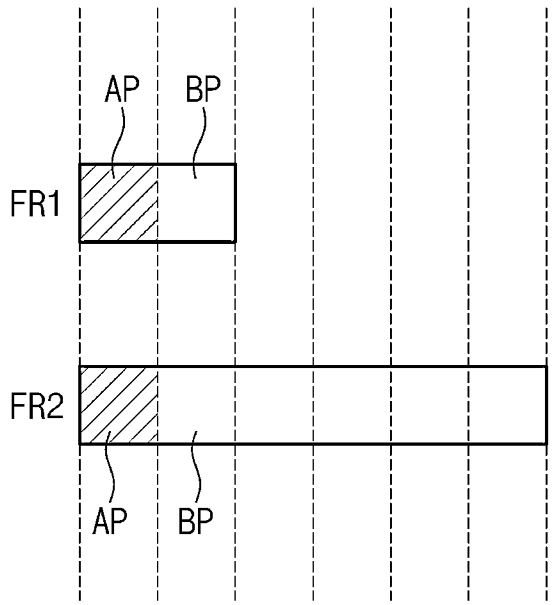
FIG. 3 is a view illustrating cycles included in a first frame and a second frame according to an embodiment of the disclosure.

FIG. 3 is a view illustrating cycles included in each of a first frame FR1 and a second frame FR2 according to an embodiment of the disclosure.

Referring to FIG. 3, in an embodiment, the display panel DP (see FIG. 2) may operate at variable driving frequencies including a first frame frequency and a second frame frequency lower than the first frame frequency. FIG. 3 illustrates a first frame FR1 when the display panel DP operates at the first frame frequency and a second frame FR2 when the display panel DP operates at the second frame frequency.

The first frame frequency may differ from the second frame frequency. In an embodiment, for example, the first frame frequency may be higher than the second frame frequency. Accordingly, the duration of the second frame FR2 may be longer than the duration of the first frame FR1. In an embodiment, for example, the first frame frequency of the first frame FR1 may be 120 Hz, and the second frame frequency of the second frame FR2 may be 40 Hz.

Each of the first frame FR1 and the second frame FR2 may include a plurality of cycles (or durations or periods). The number of blank durations (or periods) BP included in one frame may be varied depending on a frame frequency of the display panel DP. For example, as the frame frequency is decreased, the number of blank durations BP may be increased. For example, the first frame FR1 may include one active duration AP and one blank duration BP. The second frame FR2 may include one active duration AP and a plurality of blank durations BP. A pixel PXij (see FIG. 3) in the blank duration BP may emit light corresponding to data written for the active duration AP. The active duration AP may be referred to as a write duration or a write cycle. The blank duration BP may be referred to as a hold duration, a hold cycle, or a self-scan duration.

Figure 4:
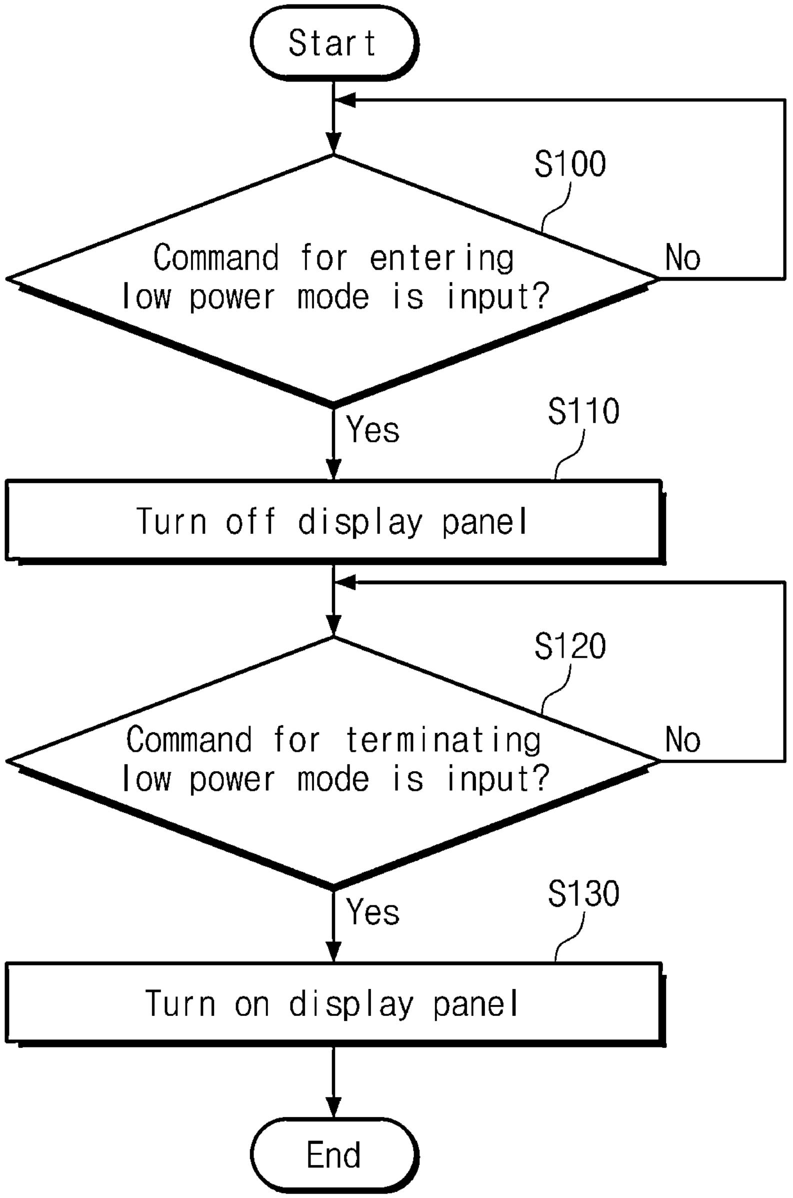
FIG. 4 is a flowchart illustrating the operation of a display device according to an embodiment of the disclosure.

FIG. 4 is a flowchart illustrating the operation of a display device DD (see FIG. 2), according to an embodiment of the disclosure.

Referring to FIGS. 1, 2, and 4, in an embodiment, the driving controller TC receives the mode control signal M-CTRL from the processing unit PU. The mode control signal M-CTRL may include the command for entering the low power mode or the command for terminating the low power mode.

The driving controller TC determines whether the command for entering the low power mode is input (S100). When the command for entering the low power mode is input, the driving controller TC may turn off the display panel DP (S110). Even if the screen of the display panel DP is turned off, the driving controller TC may be maintained to be turned on. The driving controller TC determines whether the command for terminating the low power mode is input (S120). When the command for terminating the low power mode is input, the driving controller TC may turn on the display panel DP (S130).

The operations described with reference to FIG. 4 will be described in greater detail with reference to FIGS. 5A to 5C.

Figure 5A:
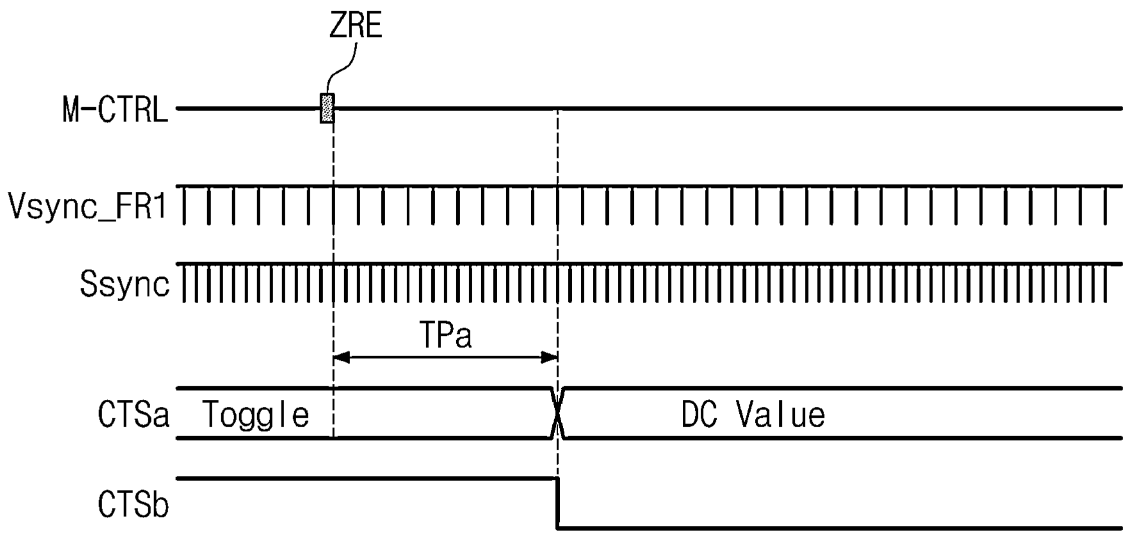
FIG. 5A is a timing diagram illustrating the operation of a display device according to an embodiment of the disclosure.

FIG. 5A is a flowchart illustrating the operation of the display device DD (see FIG. 2) according to an embodiment of the disclosure. FIG. 5B is a timing diagram illustrating the operation of a display device DD according to an embodiment of the disclosure. FIG. 5C is a timing diagram illustrating the operation of a display device DD according to an embodiment of the disclosure.

Referring to FIGS. 1, 2, 4, and 5A, in an embodiment, the driving controller TC may receive a mode control signal M-CTRL including a command ZRE for entering a low power mode, and may be configured to receive or generate a first synchronization signal Vsync_FR1 and a second synchronization signal Ssync.

The operation of the panel driver P-DV may be controlled by control signals CTSa and CTSb provided from the driving controller TC. Each of the control signals CTSa and CTSb may be included in the first control signal SCS, the second control signal DCS, and the third control signal VCS.

The panel driver P-DV may include the data driving circuit 100 to provide the data signal to the display panel DP in synchronization with the first synchronization signal Vsync_FR1. The first synchronization signal Vsync_FR1 may be a vertical synchronization signal.

When receiving the command ZRE for entering the low power mode, the driving controller TC may be configured to change the state of the control signals CTSa and CTSb after a specific time period based on the second synchronization signal Ssync. When receiving the command ZRE for entering the low power mode, the driving controller TC may be configured to count the clock of the second synchronization signal Ssync and change the states of the control signals CTSa and CTSb.

Figure 5B:
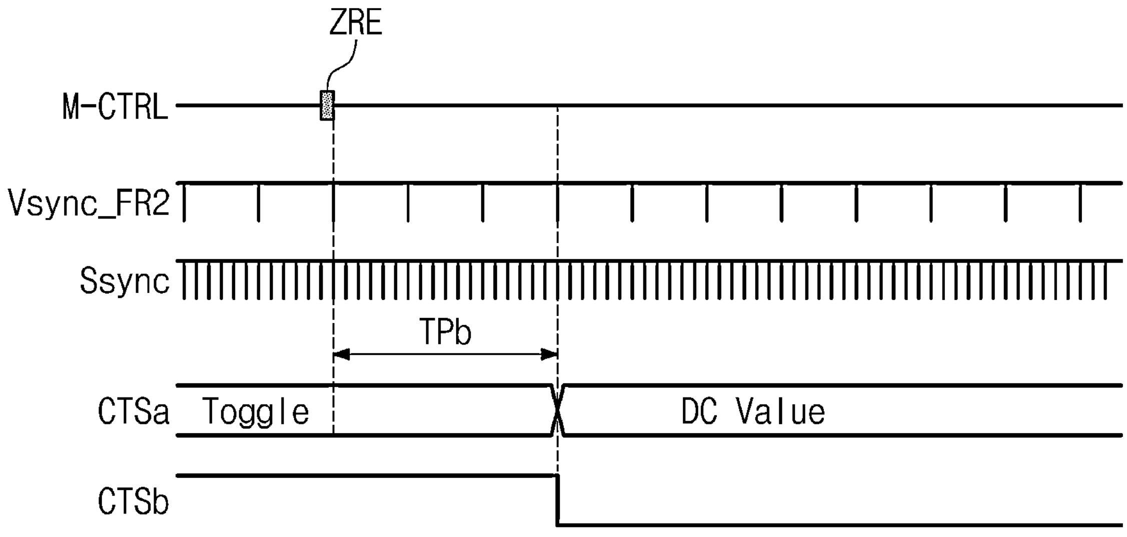
FIG. 5B is a timing diagram illustrating the operation of a display device according to an embodiment of the disclosure.
Figure 5C:
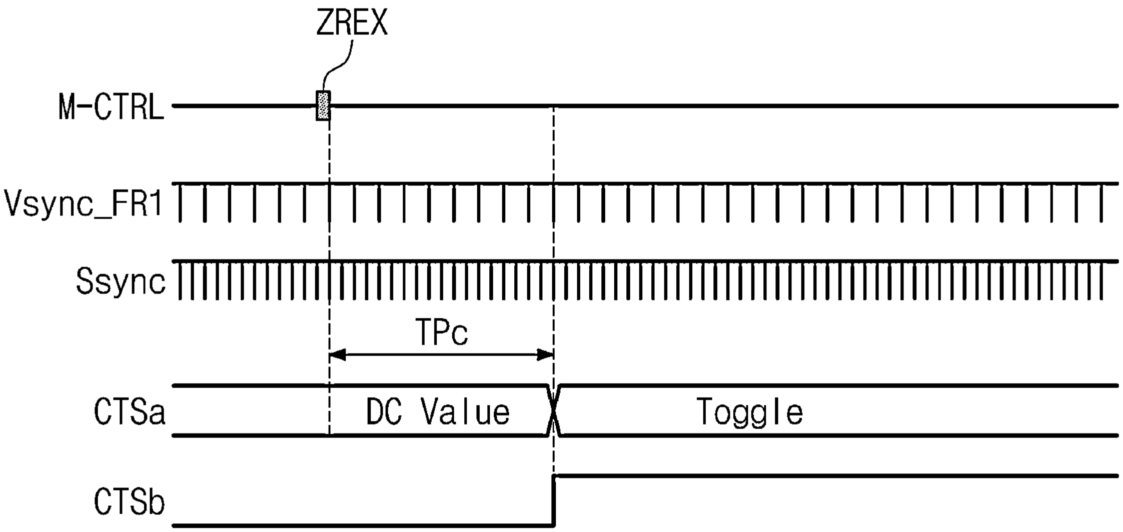
FIG. 5C is a timing diagram illustrating the operation of a display device according to an embodiment of the disclosure.

Referring to FIGS. 5A, 5B, and 5C, the first synchronization signal Vsync_FR1 may correspond to a vertical synchronization signal. Accordingly, the first synchronization signal Vsync_FR1 may be varied to correspond to the driving frequency of the display panel DP. The frequency of the first synchronization signal Vsync_FR1 illustrated in FIGS. 5A and 5C may correspond to the maximum frequency of the variable driving frequency of the display panel DP. For example, the first synchronization signal Vsync_FR1 illustrated in FIGS. 5A and 5C has the frequency corresponding to 120 Hz, and a first synchronization signal Vsync_FR2 illustrated in FIG. 5B may have the frequency corresponding to 40 Hz, but the disclosure is not limited thereto.

The driving controller TC may be configured to generate a second synchronization signal Ssync having a frequency obtained by multiplying the first synchronization signal Vsync_FR1 or Vsync_FR2 by the number of cycles included in one frame at the relevant frequency. Accordingly, the frequency of the second synchronization signal Ssync may be higher than the frequency of the first synchronization signal Vsync_FR1 or Vsyn FR2. The second synchronization signal Ssync may differ from the first synchronization signal Vsync_FR1 or Vsync_FR2. In other words, the second synchronization signal Ssync may be a signal having a constant frequency without the change in frequency to correspond to the variable driving frequency.

Referring to FIGS. 3, 5A, and 5B, the frequency of the first synchronization signal Vsync_FR1 may be 120 Hz, and the number of cycles included in one frame FR1 may be two in one frame FR1 at the relevant frequency. Accordingly, the frequency of the second synchronization signal Ssync may be 240 Hz. In addition, the frequency of the first synchronization signal Vsync_FR2 may be 40 Hz, and the number of cycles included in one frame FR2 may be six in one frame FR2 at the relevant frequency. Accordingly, the frequency of the second synchronization signal Ssync may be 240 Hz.

According to an embodiment of the disclosure, when receiving the command ZRE for entering the low power mode, the driving controller TC may be configured to count the clock of the second synchronization signal Ssync having the constant frequency and change the state of the control signals CTSa and CTSb. In such an embodiment, a count reference value serving as the reference for changing the state of the control signals CTSa and CTSb may be fixed or constant. In an embodiment, for example, the driving controller TC may change the state of each of the control signals CTSa and CTSb from the first state and the second state different from the first state, respectively, when a value obtained by counting the clocks of the second synchronization signal Ssync is 18.

According to an embodiment of the disclosure, even if the display panel DP operates at the variation driving frequency, the driving controller TC may maintain the time interval TPa or TPb between the 'off' operations of the display panel DP after receiving the command ZRE for entering the low power mode. Accordingly, the consistency in operation of the electronic device ED (see FIG. 1) may be improved, such that the product quality is improved.

Hereinafter, the control signals CTSa and CTSb may be referred to as the first control signal CTSa and the second control signal CTSb, respectively. For example, a first state of the first control signal CTSa may be a toggle state, and a second state of the first control signal CTSa may be a state having a direct current (DC) value. The first state of the second control signal CTSb may be a high level and the second state of the second control signal CTSb may be a low level. However, this is provided only for the illustrative purpose. As long as the first state is a signal state for turning on the display panel DP, and the second state is a signal state for turning off the operation of the display panel DP, the first state and the second state may be variously defined.

In addition, although FIG. 5A illustrates a case where the first control signal CTSa and the second control signal CTSb are changed from the first state to the second state in the same timing, the disclosure is not limited thereto. For example, the timing of changing the state of the first control signal CTSa and the timing of changing the state of the second control signal CTSb may be different from each other. In addition, the states of the same signals may be changed at a same timing. For example, the states of first control signals CTSa may be changed at the same timing even for frames for operating at mutually different driving frequencies.

Referring to FIGS. 1, 2, and 5C, the driving controller TC may receive a mode control signal M-CTRL including a command ZREX for terminating the low power mode. When receiving the command ZREX for terminating the low power mode, the driving controller TC may be configured to count the clock of the second synchronization signal Ssync and change the state of the control signals CTSa and CTSb.

According to an embodiment of the disclosure, the second synchronization signal Ssync may be a signal having a constant frequency without the change in frequency to correspond to the variable driving frequency of the display panel DP. In addition, a count reference value serving as the reference for changing the state of the control signals CTSa and CTSb may be fixed or constant. For example, the driving controller TC may change the states of control signals CTSa and CTSb from the second state to the first state, when the value, which is obtained by counting the second synchronization signal Ssync, is '18'. In other words, even if the display panel DP operates at the variable driving frequency, the driving controller TC may consistently maintain a time interval TPc between 'on' operations of the display panel DP after receiving the command ZREX for terminating the low power mode. Accordingly, the consistency in operation of the electronic device ED (see FIG. 1) may be improved, such that the product quality is improved.

Figure 6:
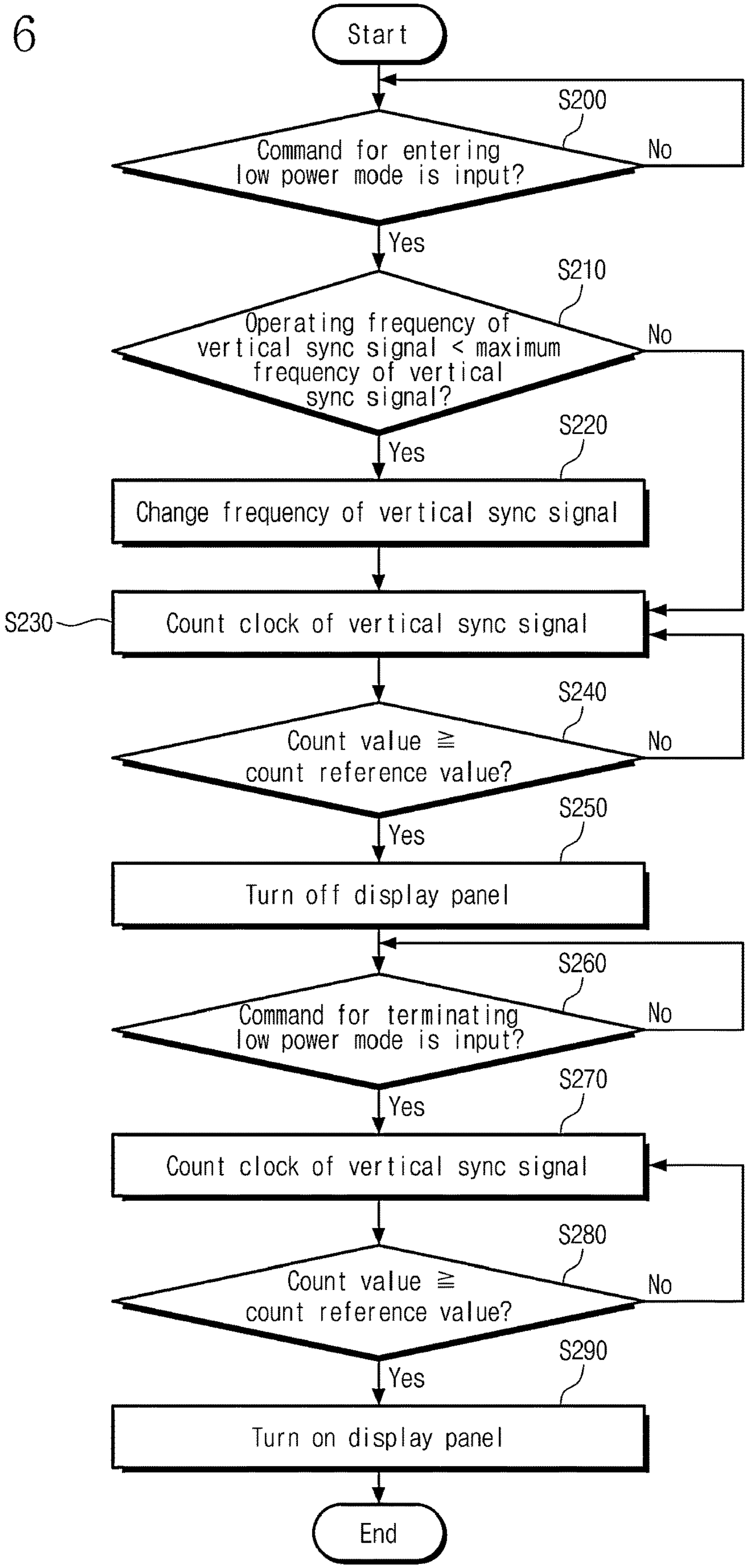
FIG. 6 is a flowchart illustrating the operation of a display device according to an embodiment of the disclosure.
Figure 7:
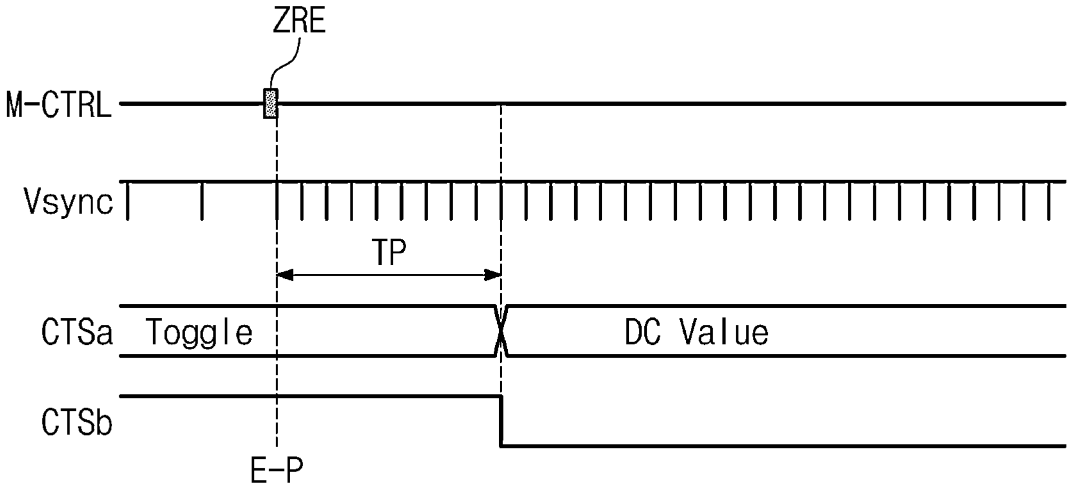
FIG. 7 is a timing diagram illustrating the operation of a display device according to an embodiment of the disclosure.

FIG. 6 is a flowchart illustrating the operation of a display device DD (see FIG. 2) according to an embodiment of the disclosure. FIG. 7 is a timing diagram illustrating the operation of a display device DD according to an embodiment of the disclosure.

Referring to FIGS. 1, 2, 6, and 7, in an embodiment, the driving controller TC receives the mode control signal M-CTRL from the processing unit PU. The mode control signal M-CTRL may include the command ZRE for entering the low power mode and the command for terminating the low power mode.

The driving controller TC determines whether the command ZRE for entering the low power mode is input (S200). When the command ZRE for entering the low power mode is input, the driving controller TC may compare an operating frequency of the vertical synchronization signal Vsync with the maximum frequency of the vertical synchronization signal Vsync (S210).

The operating frequency of the vertical synchronization signal Vsync may correspond to the driving frequency of the display panel DP. The maximum frequency of the vertical synchronization signal Vsync may have a constant value corresponding to the maximum frequency of the variable driving frequency of the display panel DP.

According to an embodiment of the disclosure, when the operating frequency of the vertical synchronization signal Vsync is lower than the maximum frequency of the vertical synchronization signal Vsync, the driving controller TC may change the frequency of the vertical synchronization signal Vsync (S220). In an embodiment, for example, the driving controller TC may change the frequency of the vertical synchronization signal Vsync to the maximum frequency. The vertical synchronization signal Vsync having the operating frequency corresponding to the operating frequency of the display panel DP may be referred to as the first synchronization signal, and the vertical synchronization signal Vsync having the maximum frequency changed may be referred to as the second synchronization signal. In other words, according to an embodiment of the disclosure, the first synchronization signal and the second synchronization signal may be defined by a same signal (e.g., the vertical synchronization signal Vsync), that is, parts of the same signal.

When the operating frequency of the vertical synchronization signal Vsync is equal to or greater than the maximum frequency of the vertical synchronization signal Vsync, in other words, when the operating frequency of the vertical synchronization signal Vsync is the maximum frequency, the driving controller TC may not change the frequency of the vertical synchronization signal Vsync.

In FIG. 7, the frequency of the vertical synchronization signal Vsync may be 40 Hz, before the command ZRE for entering the low power mode is input. After the command ZRE for entering the low power mode is input, the frequency of the vertical synchronization signal Vsync may be changed from 40 Hz to 120 Hz which is the maximum frequency. However, the maximum frequency is provided only for the illustrative purpose, but the disclosure is not limited thereto.

The driving controller TC may count the clock of the vertical synchronization signal having the maximum frequency (S230). The driving controller TC compares a count value, which is obtained by counting the clock of the vertical synchronization signal Vsync, with a count reference value (S240). The driving controller TC determines whether the count value is equal to or greater than the count reference value. When the count value is equal to or greater than the count reference value, the driving controller TC may turn off the display panel DP (S250).

According to an embodiment of the disclosure, when receiving the command ZRE for entering the low power mode, the driving controller TC may be configured to count the clock of the vertical synchronization signal Vsync having the frequency changed to the maximum frequency from a time point E-P when the command ZRE is received to change the states of the control signals CTSa and CTSb. In an embodiment, for example, the driving controller TC may change the states of the control signals CTSa and CTSb from the first state to the second state different from the first state, when the value, which is obtained by counting the vertical synchronization signal Vsync is 9.

According to an embodiment of the disclosure, when the command ZRE for entering the low power mode is received, as the frequency of the vertical synchronization signal Vsync is changed to the maximum frequency, a portion of the vertical synchronization signal Vsync serving as the reference for the 'off' operation of the display panel DP may be a signal having a constant frequency. In addition, a count reference value serving as the reference for changing the states of the control signals CTSa and CTSb may be constant. In other words, even if the display panel DP operates at the variable driving frequency, the driving controller TC may consistently maintain the time interval TPc between the 'off' operations of the display panel DP after receiving the command ZRE for entering the low power mode. Accordingly, the consistency in operation of the electronic device ED (see FIG. 1) may be improved, such that the product quality is improved.

Even if the screen of the display panel DP is turned off, the driving controller TC may be maintained to be turned on. The driving controller TC determines whether the command for terminating the low power mode is input (S260). When the command for terminating the low power mode is input, the driving controller TC may count the clock of the vertical synchronization signal Vsync (S270). The driving controller TC compares a value, which is obtained by counting the clocks of the vertical synchronization signal Vsync, with the count reference value (S280). The timing controller TC determines whether the count value is equal to or greater than the count reference value. When the count value is equal to or greater than the count reference value, the driving controller TC may turn on the display panel DP (S290).

Figure 8:
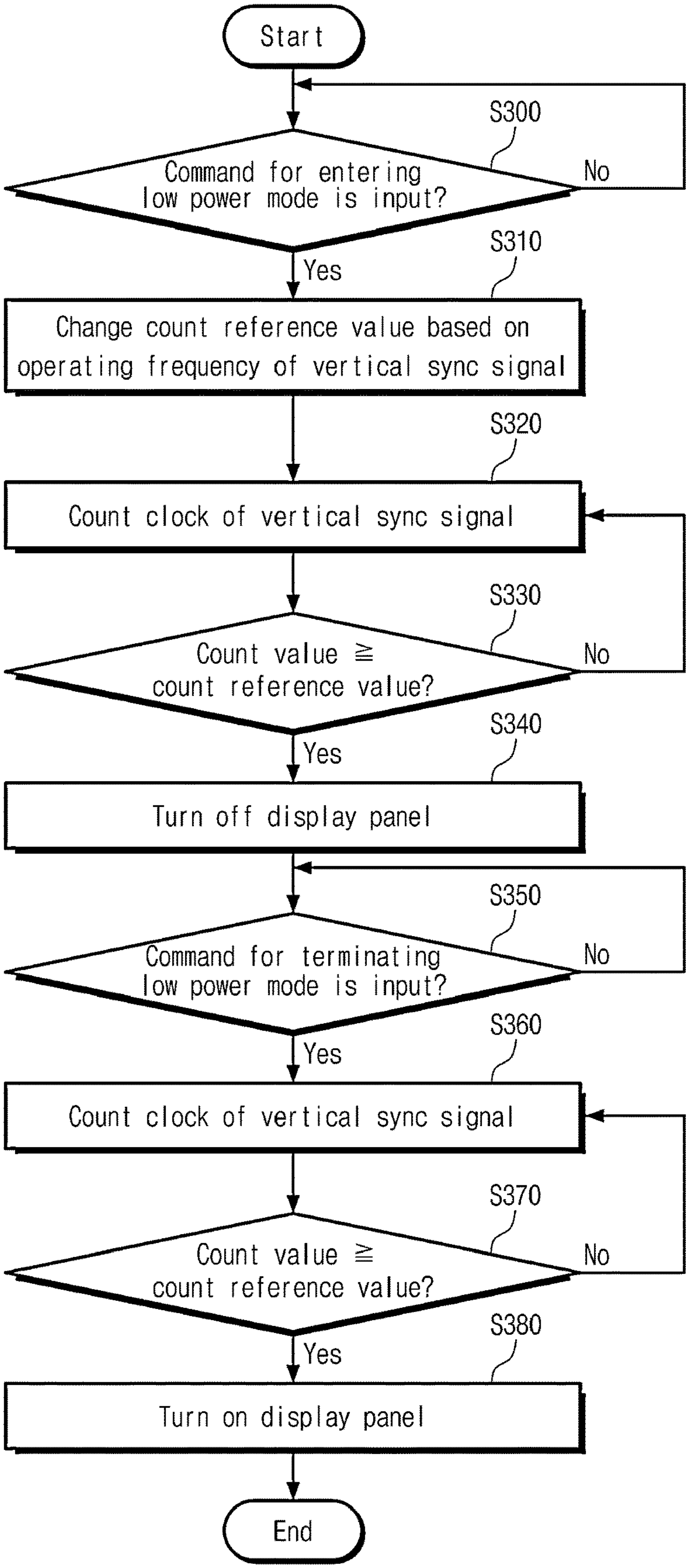
FIG. 8 is a flowchart illustrating the operation of a display device according to an embodiment of the disclosure.
Figure 9A:
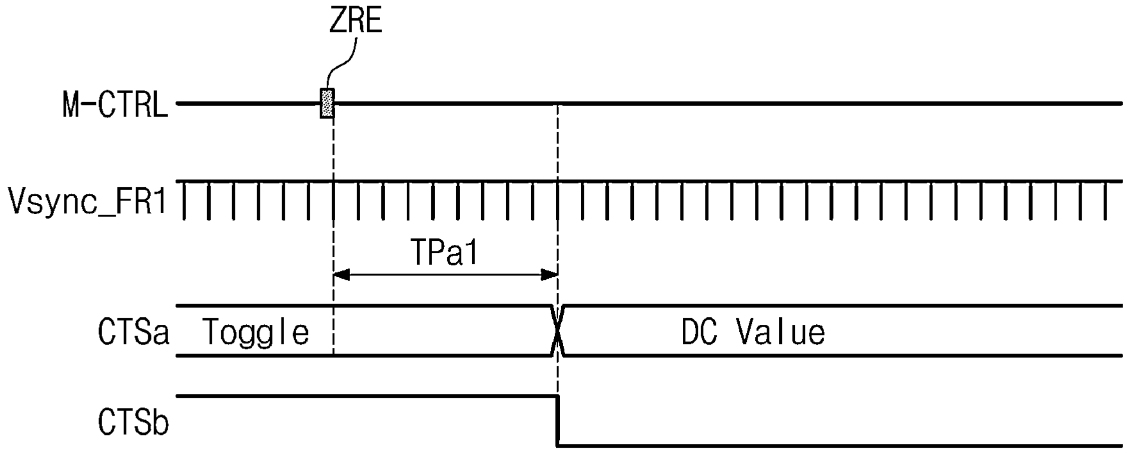
FIG. 9A is a timing diagram illustrating the operation of a display device according to an embodiment of the disclosure.
Figure 9B:
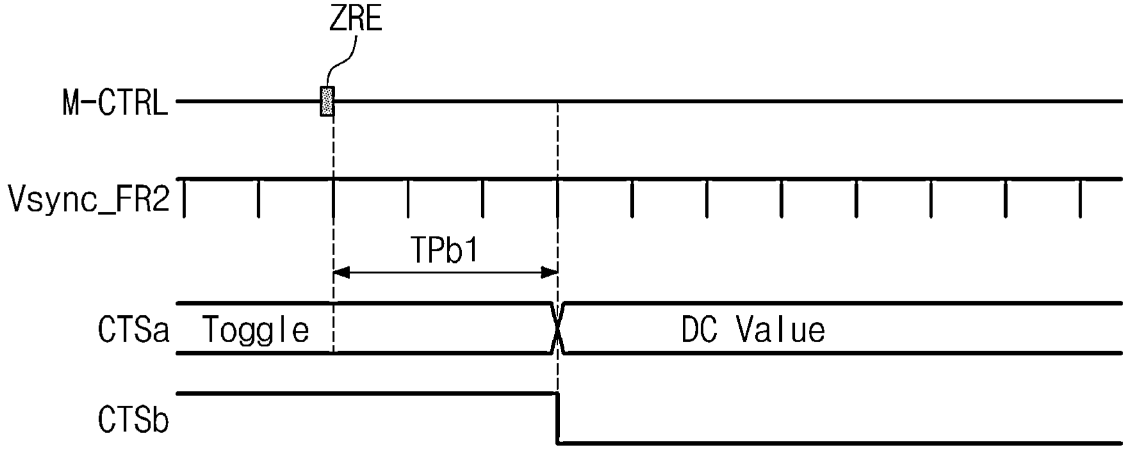
FIG. 9B is a timing diagram illustrating the operation of a display device according to an embodiment of the disclosure.

FIG. 8 is a flowchart illustrating the operation of a display device DD (see FIG. 2), according to an embodiment of the disclosure. FIG. 9A is a timing diagram illustrating the operation of a display device DD, according to an embodiment of the disclosure. FIG. 9B is a timing diagram illustrating the operation of a display device DD, according to an embodiment of the disclosure.

Referring to FIGS. 1, 2, 8, 9A, and 9B, in an embodiment, the driving controller TC receives a mode control signal M-CTRL from the processing unit PU. The mode control signal M-CTRL may include the command ZRE for entering the low power mode and the command for terminating the low power mode.

The driving controller TC determines whether the command ZRE for entering the low power mode is input (S300). When the command ZRE for entering the low power mode is input, the driving controller TC may change the count reference value based on the operating frequency of the vertical synchronization signal Vsync_FR1 or Vsync_FR2 (S310).

Referring to FIG. 9A, the frequency of the vertical synchronization signal Vsync_FR1 may be 120 Hz. In this case, the count reference value may be '9'. Referring to FIG. 9B, the frequency of the vertical synchronization signal Vsync_FR2 may be 40 Hz. In this case, the count reference value may be 3. In other words, according to an embodiment of the disclosure, the difference in time Tp between 'off' operations of the display panel DP may be reduced after receiving the command ZRE for entering the low power mode by changing the count reference value without changing the operating frequency of the vertical synchronization signal Vsync_FR1 or Vsync_FR2.

In an embodiment, for example, the driving controller TC may store the count reference value in the vertical synchronization signal Vsync, which corresponds to the maximum frequency of the variable driving frequency, as a first count reference value. The driving controller TC may generate a second count reference value, which is equal to or less than the first count reference value, depending on the operating frequency of the vertical synchronization signal corresponding to the variable driving frequency, when receiving the command ZRE for entering the low power mode or the command for terminating the low power mode.

The second count reference value may be obtained based on a value, which is obtained by multiplying a value, which is obtained by dividing the operating frequency by the maximum frequency, by the first count reference value. For example, when the vertical synchronization signal Vsync_FR2 is input, the operating frequency may be 40 Hz. Accordingly, '3' obtained as multiplying the value, which is obtained by dividing the operating frequency of 40 Hz by the maximum frequency of 120 HZ, by the reference value of '9' becomes the second count reference value. When the second count reference value includes a decimal point depending on the operating frequency, the value below the decimal point may be chopped. Accordingly, the second count reference value may have the integer value of '0' or more.

The driving controller TC may count the clock of the vertical synchronization signal Vsync_FR1 or Vsync_FR2 (S320). The driving controller TC compares a value, which is obtained by counting the clocks of the vertical synchronization signal Vsync, with the count reference value (S330). The timing controller TC determines whether the count value is equal to or greater than the count reference value. When the count value is equal to or greater than the count reference value, the driving controller TC may turn off the display panel DP (S340).

Even if the screen of the display panel DP is turned off, the driving controller TC may be maintained to be turned on. The driving controller TC determines whether the command for terminating the low power mode is input (S350). When the command for terminating the low power mode is input, the driving controller TC may count the clock of the vertical synchronization signal Vsync (S360). The driving controller TC compares a value, which is obtained by counting the clocks of the vertical synchronization signal Vsync, with the count reference value (S370). The count reference value may be a value changed based on the operating frequency of the vertical synchronization signal Vsync_FR1 or Vsync_FR2. The timing controller TC determines whether the count value is equal to or greater than the count reference value. When the count value is equal to or greater than the count reference value, the driving controller TC may turn on the display panel DP (S380).

According to an embodiment of the disclosure, when the command ZRE for entering the low power mode, although the operating frequency of the vertical synchronization signal Vsync_FR1 or Vsync_FR2 may be maintained, the count reference value serving as the reference for changing the states of the control signals CTSa and CTSb may be changed depending on the operating frequency of the vertical synchronization signal Vsync_FR1 or Vsync_FR2. In other words, even if the display panel DP operates at the variable driving frequency, the driving controller TC may consistently reduce the time difference TPa1 and TPb1 between the 'on' operations of the display panel DP, after receiving the command ZRE for entering the low power mode. Accordingly, the consistency in operation of the electronic device ED (see FIG. 1) may be improved, such that the product quality is improved.

In embodiments of the disclosure, as described above, the driving controller having the mode control signal, which is received in the driving controller and includes a command for entering a lower power mode, may control a control signal provided to a panel driver, thereby turning off the screen of the display panel. Accordingly, the power consumption of the electronic device may be reduced. In such embodiments, the driving controller may reduce or remove the time difference between a time point when a command for entering or terminating the lower power mode is received and an 'on' operation or an 'off' operation of the display panel after receiving the command. In addition, when the operation for entering the lower power mode and the operation for terminating the lower power mode occur in the mode driving at the variable driving frequency, as the time difference is reduced when the 'on' operation and the 'off' operation of the display panel are switched, the consistency in the operation of the electronic device may be improved, such that the product quality is improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a driving controller which receives an image signal and a signal including a command for entering a low power mode, or a command for terminating the low power mode, and generates or receives a first synchronization signal and a second synchronization signal;

a panel driver which operates in response to a control signal provided from the driving controller; and a display panel which is controlled by the panel driver, wherein the display panel selectively operates in a first mode for operating at a specific driving frequency or a second mode for operating at a variable driving frequency, wherein the panel driver includes:

a data driving circuit which provides a data signal to the display panel in synchronization with the first synchronization signal, and wherein the driving controller changes the control signal by counting a clock of the second synchronization signal, when receiving the command for entering the low power mode or the command for terminating the low power mode, and wherein the driving controller changes the control signal from a first state to a second state different from the first state by counting a clock of the second synchronization signal, when receiving the command for entering the low power mode.

2. The display device of claim 1, wherein a frequency of the first synchronization signal is varied to correspond to a driving frequency of the display panel.

3. The display device of claim 1, wherein a maximum frequency of the first synchronization signal, which corresponds to a maximum frequency of the variable driving frequency, is equal to or less than a frequency of the second synchronization signal.

4. The display device of claim 1, wherein the second synchronization signal is different from the first synchronization signal.

5. The display device of claim 1, wherein the driving controller generates the second synchronization signal to have a frequency obtained by multiplying a frequency of the first synchronization signal by a number of cycles included in one frame corresponding to the frequency of the first synchronization signal.

6. The display device of claim 1, wherein the second synchronization signal and the first synchronization signal are defined by a same signal.

7. The display device of claim 6, wherein the driving controller changes a count reference value serving as a reference for changing a state of the control signal.

8. The display device of claim 7, wherein the driving controller designates, as a first count reference value, a count reference value at a maximum frequency of the first synchronization signal corresponding to a maximum frequency of the variable driving frequency, and wherein the driving controller generates a second count reference value, which is less than the first count reference value, based on an operating frequency of the first synchronization signal corresponding to the variable driving frequency, when receiving the command for entering the low power mode or the command for terminating the low power mode.

9. The display device of claim 8, wherein the second count reference value is obtained based on a value obtained by multiplying a value, which is obtained by dividing the operating frequency by the maximum frequency of the first synchronization signal, by the first count reference value.

10. The display device of claim 6, wherein the driving controller generates the second synchronization signal by changing an operating frequency of the first synchronization signal corresponding to the variable driving frequency, when receiving the command for entering the low power mode or the command for terminating the low power mode.

11. The display device of claim 10, wherein the driving controller generates the second synchronization signal by changing the operating frequency of the first synchronization signal to a maximum frequency, when the operating frequency of the first synchronization signal is lower than the maximum frequency of the first synchronization signal corresponding to a maximum frequency of the variable driving frequency.

12. The display device of claim 1, wherein the driving controller changes the control signal from the second state to the first state by counting the clock of the second synchronization signal, when receiving the command for terminating the low power mode.

13. A display device comprising:

a driving controller which receives an image signal, and a signal including a command for entering a low power mode, or a command for terminating the low power mode, and generates a synchronization signal;

a panel driver which operates in response to a control signal provided from the driving controller; and a display panel which is controlled by the panel driver, wherein the driving controller generates a count value by counting a clock of the synchronization signal, when receiving the command for entering or terminating the low power mode, and changes the control signal from a first state to a second state different from the first state, when the count value is equal to or greater than a count reference value, and wherein at least one selected from a frequency of the synchronization signal and the count reference value is constant.

14. The display device of claim 13, wherein the panel driver includes:

a data driving circuit which provides a data signal to the display panel in synchronization with the synchronization signal, and wherein the display panel selectively operates in a first mode for operating a specific driving frequency or a second mode for operating at a variable driving frequency.

15. The display device of claim 14, wherein the driving controller designates, as a first count reference value, a count reference value at a maximum frequency of the synchronization signal corresponding to a maximum frequency of the variable driving frequency, and wherein the driving controller generates a second count reference value, which is less than the first count reference value, based on an operating frequency of the synchronization signal corresponding to the variable driving frequency, when receiving the command for entering the low power mode or the command for terminating the low power mode.

16. The display device of claim 14, wherein the driving controller changes an operating frequency of the synchronization signal to a maximum frequency of the variable driving frequency, when the operating frequency of the synchronization signal corresponding to the variable driving frequency is lower than a maximum frequency of the synchronization signal corresponding to the maximum frequency of the variable driving frequency, and when receiving the command for entering the low power mode or the command for terminating the low power mode.

17. The display device of claim 13, wherein the panel driver includes:

a data driving circuit which provides a data signal to the display panel in synchronization with a vertical synchronization signal, wherein the display panel selectively operates in a first mode for operating a specific driving frequency or a second mode for operating at a variable driving frequency, and wherein a maximum frequency of the vertical synchronization signal, which corresponds to a maximum frequency of the variable driving frequency, is equal to or less than a frequency of the synchronization signal.

18. An electronic device comprising a display device comprising:

a driving controller which receives an image signal, and a signal including a command for entering a low power mode, or a command for terminating the low power mode, and generates a synchronization signal;

a panel driver which operates in response to a control signal provided from the driving controller; and a display panel which is controlled by the panel driver, wherein the display panel selectively operates in a first mode for operating at a specific driving frequency or a second mode for operating at a variable driving frequency, wherein the panel driver includes:

a data driving circuit which provides a data signal to the display panel in synchronization with the synchronization signal, and wherein the driving controller changes the control signal based on the synchronization signal after a specific time period, when receiving the command for entering the low power mode or the command for terminating the low power mode, and wherein a frequency of the synchronization signal is changed from a first frequency to a second frequency, which is equal to or greater than the first frequency, when receiving the command for entering the low power mode or the command for terminating the low power mode.

19. The electronic device of claim 18, wherein the driving controller changes the first frequency to a maximum frequency of a variable driving frequency, when the first frequency is lower than a maximum frequency of the synchronization signal corresponding to the maximum frequency of the variable driving frequency.

* * * * *